United States Patent
Young et al.

(10) Patent No.: US 9,527,950 B2
(45) Date of Patent: Dec. 27, 2016

(54) RECIPROCATING-PLATE COLUMN REACTOR FOR EPOXIDATION OF EPOXY RESINS

(75) Inventors: Thomas C. Young, Lake Jackson, TX (US); William G. Worley, Missouri City, TX (US); Robert M. Drake, Richwood, TX (US)

(73) Assignee: BLUE CUBE IP LLC, Midland, MI (US)

( * ) Notice: Subject to any disclaimer, the term of this patent is extended or adjusted under 35 U.S.C. 154(b) by 370 days.

(21) Appl. No.: 13/600,461

(22) Filed: Aug. 31, 2012

(65) Prior Publication Data

US 2013/0079489 A1  Mar. 28, 2013

Related U.S. Application Data

(60) Provisional application No. 61/539,618, filed on Sep. 27, 2011, provisional application No. 61/602,159, filed on Sep. 23, 2012.

(51) Int. Cl.
*C08G 59/06* (2006.01)
*C08G 59/02* (2006.01)

(52) U.S. Cl.
CPC .......... *C08G 59/022* (2013.01); *C08G 59/063* (2013.01)

(58) Field of Classification Search
None
See application file for complete search history.

(56) References Cited

U.S. PATENT DOCUMENTS

| | | | |
|---|---|---|---|
| 2,848,435 A | | 8/1958 | Griffin et al. |
| 3,766,221 A | * | 10/1973 | Becker ......................... 549/517 |
| 4,228,271 A | * | 10/1980 | Enikolopov et al. ........... 528/95 |
| 5,310,955 A | | 5/1994 | Shirtum et al. |
| 5,372,790 A | | 12/1994 | Shirtum et al. |
| 2013/0066091 A1 | * | 3/2013 | Arrowood et al. ............ 554/159 |
| 2014/0336348 A1 | * | 11/2014 | Atias ................... C08G 59/063 528/88 |

FOREIGN PATENT DOCUMENTS

EP  0028810 A3  8/1981

* cited by examiner

*Primary Examiner* — Robert Sellers
(74) *Attorney, Agent, or Firm* — Polsinelli PC

(57) ABSTRACT

A process comprising: a) contacting a polyhydric phenol and an epihalohydrin in the presence of a catalyst under reaction conditions to form an organic feed comprising a bishalohydrin ether and a solvent; b) contacting the organic feed and an aqueous feed comprising an inorganic hydroxide in a reciprocating-plate column reactor under reaction conditions to form a dispersed aqueous phase and an organic product; and c) collecting the organic product comprising an epoxy resin, is disclosed.

17 Claims, 2 Drawing Sheets

Karr

Procházka

Tojo/Miyanami

RECIPROCATING-PLATE COLUMN REACTOR FOR EPOXIDATION OF EPOXY RESINS

REFERENCE TO RELATED APPLICATIONS

The present application claims the benefit of U.S. Provisional Application No. 61/539,618, filed on Sep. 27, 2011 and U.S. Provisional Application No. 61/602,159, filed on Feb. 23, 2012.

FIELD OF THE INVENTION

Embodiments disclosed herein relate generally to a process of producing epoxy resins by contacting a polyhydric phenol with an epihalohydrin to form a chlorohydrin intermediate, and subsequently contacting the chlorohydrin intermediate with an inorganic hydroxide.

BACKGROUND OF THE INVENTION

The production of epoxy resins from polyhydric phenols and epihalohydrins requires the etherification (coupling) of the phenol and the epihalohydrin and the dehydrohalogenation (epoxidation) of the coupled chlorohydrins intermediate using aqueous inorganic hydroxides. For the epoxidation of the coupled chlorohydrin intermediate, the problem is to contact the inorganic hydroxide, which has almost no solubility in the organic phase, with the chlorohydrin intermediate, which has almost no solubility in the aqueous phase, to generate an epoxy resin with very low chlorohydrin content without excessive hydrolysis of the epihalohydrin.

Reciprocating-plate columns (such as Karr columns) are well known for use in liquid-liquid extraction and consist of a vertical column which contains a set of perforated plates attached by one or more common shafts. A motor drives the shaft, which reciprocates up and down to provide agitation and break up the dispersed phase into small droplets. The heavy phase moves down the column while the light phase moves up the column. In this way, the two insoluble phases are brought into contact to allow enhanced mass transfer between the two phases. For extraction, reciprocating plate columns are cited has having more uniform shear patterns than columns with rotating agitators, which leads to more uniform drop size distribution, higher volumetric capacity and better turndown capability. By using a reciprocating-plate column in this invention, complete epoxidation can be achieved with low epichlorohydrin yield losses.

SUMMARY OF THE INVENTION

In an embodiment of the invention, there is disclosed a process comprising, consisting of, or consisting essentially of: a) contacting a polyhydric phenol and an epihalohydrin in the presence of a catalyst under reaction conditions to form an organic feed comprising a bishalohydrin ether and a solvent; b) contacting said organic feed and an aqueous feed comprising an inorganic hydroxide in a reciprocating-plate column reactor under reaction conditions to form a dispersed aqueous phase and an organic product; and c) collecting said organic product comprising an epoxy resin.

BRIEF DESCRIPTION OF THE DRAWINGS

For the purpose of illustrating the present invention, the drawings show a form of the present invention which is presently preferred. However, it should be understood that the present invention is not limited to the precise arrangements and instrumentation shown in the drawings.

DETAILED DESCRIPTION OF THE INVENTION

Figure 1:
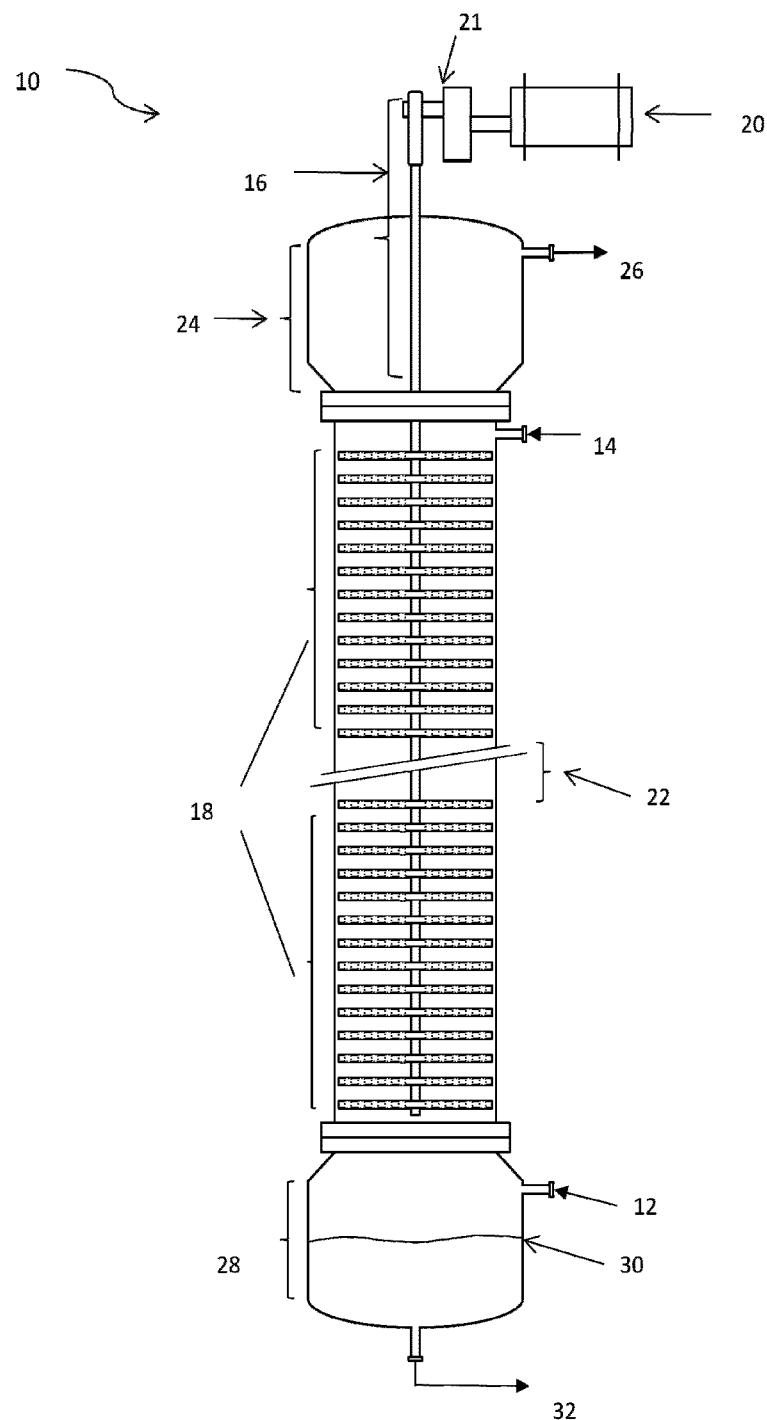
FIG. 1 is an overall schematic of a reciprocating plate column.

In an embodiment of the present invention, there is disclosed a process comprising, consisting of, or consisting essentially of: a) contacting a phenol and an epihalohydrin in the presence of a catalyst under reaction conditions to form an organic feed comprising a bishalohydrin ether and a solvent; b) contacting said organic feed and an aqueous feed comprising an inorganic hydroxide in a reciprocating-plate column reactor under reaction conditions to form a dispersed aqueous phase and an organic product comprising an epoxy resin; and c) collecting said organic product.

Step (a)

In an embodiment, step a) comprises contacting a phenol and an epihalohydrin in the presence of a catalyst under reaction conditions to form an organic feed comprising a bishalohydrin ether and a solvent.

In an embodiment, the phenol is a polyhydric phenol. Suitable phenols for use in the present invention include, but are not limited to bisphenol-A, bisphenol-F, phenol-formaldehyde novolacs, cresol-formaldehyde novolacs, bisphenol-A-formaldehyde novolacs, trisphenols, biphenols, diphenols, hydroquinone, resorcinol, catechol, polycyclopentadiene polyphenols and a variety of other materials.

Other examples of phenols useful in the present invention are described in U.S. Pat. No. 4,499,255, which is incorporated herein by reference.

In an embodiment, bisphenol-A is used.

Epihalohydrins suitable for use in the present invention include, but are not limited to epichlorohydrin, epibromohydrin, methylepichlorohydrin, or any other known epihalohydrin. In an embodiment, the epihalohydrin is epichlorohydrin.

Any known etherification catalyst can be used in step a). The etherification catalyst may be an inorganic hydroxide. Preferably the inorganic hydroxide is an alkali metal hydroxide or an alkaline earth hydroxide. Examples include, but are not limited to sodium hydroxide, potassium hydroxide, and calcium hydroxide. In an embodiment, sodium hydroxide is used. Other anionic etherification catalysts useful in this invention include quaternary ammonium halide catalysts such as benzyl trimethyl ammonium chloride, benzyl triethyl ammonium chloride, tetraethyl ammonium chloride, tetramethyl ammonium chloride, tetraethanol ammonium chloride, tetraethanol ammonium hydroxide and the like. Other useful etherification catalysts include quaternary phosphonium compounds, sulfonium compounds and the like. Suitable quaternary phosphonium compounds include ethyl triphenyl phosphonium iodide, ethyl triphenyl phosphonium bicarbonate, benzyl triphenyl phosphonium chloride, tetrabutyl phosphonium chloride and the like. Suitable sulfonium catalysts include thiourea catalysts such as tetramethyl thiourea, N,N'-diphenyl thiourea and the like. Basic ion exchange resins, such as DOWEX™ MSA-1, available from The Dow Chemical Company, Midland, Mich., are also useful catalysts. Additional etherification catalysts are described in U.S. Pat. No. 4,624,975 and U.S. Pat. No. 5,245,057, which are incorporated herein by reference.

Reaction conditions for step a) can include a reaction temperature in the range of from about 10° C. to about 100° C. In an embodiment, the reaction temperature is in the range of from about 20° C. to about 80° C., and in yet another embodiment, the reaction temperature is in the range of from about 30° C. to about 60° C.

The etherification reaction is preferably conducted with an excess of the epihalohydrin, more preferably using from more than 1 mole to 20 moles of the epihalohydrin per mole-equivalent of phenolic hydroxyl (OH) moiety, and most preferably using between 2 moles and 10 moles of epihalohydrin per mole-equivalent of phenolic OH moiety.

If an inorganic hydroxide is used as the etherification catalyst, preferably only enough inorganic hydroxide is used in step a) to etherify a substantial majority of the phenolic OH groups. Preferably, the ratio of mole equivalents of hydroxide to mole equivalents of phenolic OH is between 0.1:1 and 0.95:1. More preferably, the ratio of mole equivalents of inorganic hydroxide to mole equivalents of phenolic OH is between 0.25:1 and 0.85:1. Most preferably, the ratio of mole equivalents of inorganic hydroxide to mole equivalents of phenolic OH is between 0.5:1 and 0.75:1. The inorganic hydroxide may be a solid or an aqueous solution. Preferably, the inorganic hydroxide comprises a 5-50 wt. % solution in water. More preferably, the inorganic hydroxide comprises a 10-25 wt. % solution in water. In some embodiments, the strength of the aqueous solution is preferably chosen such that the byproduct inorganic halide does not precipitate during the reaction.

The reaction may be conducted in the presence of a cosolvent. Generally, any solvent which contains an alcohol functionality can be used. Examples of suitable aliphatic alcohols include, but are not limited to methanol, ethanol, n-propanol, 2-propanol, n-butanol, 2-butanol, t-butanol, 2-methyl-2-butanol, 1-pentanol, 2-pentanol, 3-pentanol, 2-methyl-1-pentanol, 2-methyl-2-pentanol, and 4-methyl-2-pentanol. Examples of suitable alcohol with ether functionalities are 1-methoxy-2-ethanol, 1-ethoxy-2-ethanol, 1-butoxy-2-ethanol, 1-methoxy-2-propanol, 1-ethoxy-2-propanol, 1-isobutoxy-2-propanol, 1-phenoxy-2-propanol, 1-methoxy-2-butanol, 3-methoxy-1-butanol, 3-methoxy-3-methylbutanol, ethylene glycol monoisopropyl ether, ethylene glycol monoisobutyl ether, ethylene glycol mono-n-butyl ether, and ethylene glycol mono-tert-butyl ether.

Alcohols with secondary or tertiary alcohol functionalities are preferred to limit reactivity with the epihalohydrin. In an embodiment, examples of alcohols used are isopropanol and 1-methoxy-2-propanol. The amount by weight of the reaction cosolvent used is preferably from 0.2 to 10 times the weight of the epihalohydrin used, more preferably from 0.5 to 5 times the weight of the epihalohydrin used.

The etherification reaction may also be conducted in the presence of an organic dilution solvent. The dilution solvent may be any solvent which increases solubility of the epoxy resin in the organic phase. The dilution solvent, when used, preferably contains no functionalities that react easily with the polyhydric phenol, the epihalohydrin, the alkali metal or alkali earth metal hydroxide, or water. The dilution solvent preferably has limited solubility in water to facilitate brine separation and water washing. Examples of suitable dilution solvents include aromatic hydrocarbons, halogenated hydrocarbons, ketones and ethers. Especially suitable dilution solvents include, but are not limited to, toluene, xylenes, methyl ethyl ketone and methyl isobutyl ketone. Mixtures of one or more of these solvents may also be used. The amount by weight of the dilution solvent used is preferably from 0.2 to 10 times the weight of the epihalohydrin used, more preferably from 0.5 to 5 times the weight of the epihalohydrin used.

Bishalohydrin Ether Product

The crude reaction product of the etherification reaction comprises the bishalohydrin ether product of the reaction of the polyhydric phenol and the epihalohydrin, where a substantial majority of the phenolic OH groups have been etherified with the epihalohydrin. Preferably, 50% or more of the phenolic OH groups have been etherified. More preferably, 80% or more of the phenolic OH groups have been etherified. Most preferably, 95% or more of the phenolic OH groups have been etherified. The etherified phenolic OH groups will comprise both halohydrin ether and glycidyl ether end groups. The bishalohydrin ether is typically dilute in an organic feed solution which comprises the excess epihalohydrin, the optional cosolvent and/or the optional dilution solvent.

The crude reaction product of the etherification reaction may also comprise an aqueous phase containing the unreacted inorganic hydroxide. The aqueous phase may also comprise an inorganic halide which may be a byproduct of the etherification reaction when inorganic hydroxides are used as the etherification catalyst. All or part of the aqueous phase may be separated from the organic feed solution containing the bishalohydrin ether before step b). Preferably, the majority of the aqueous phase is separated from the organic solution before step b).

Preferably, the majority of the epihalohydrin, the optional cosolvent, and/or the optional dilution solvent are not removed from the crude reaction product mixture before step b). Alternatively, all or most of the excess epihalohydrin, the optional cosolvent, the optional dilution solvent and/or the etherification catalyst may be removed from this mixture and replaced with another solvent before step b). The replacement solvent may be the same as the reaction cosolvent solvent or the dilution solvent, or may be a mixture of solvents. Preferably, the organic feed to step b) will comprise 10% or more solvent content by weight, where the solvent content includes any epihalohydrin, optional cosolvent, optional dilution solvent and/or replacement solvent that may be present. More preferably, the organic feed to step b) will comprise 30% or more solvent by weight. Most preferably, the organic feed to step b) will comprise 50% or more solvent by weight.

Step (b)

In an embodiment, step b) comprises contacting said organic feed and an aqueous feed comprising a hydroxide in a reciprocating-plate column reactor under reaction conditions to form a dispersed aqueous phase and an organic product comprising an epoxy resin and an aqueous byproduct comprising a halide.

In an embodiment, the hydroxide is an inorganic hydroxide. This can be the same component as the etherification catalyst described above in step a). Preferably, the hydroxide comprises an aqueous composition that is adjusted to prevent precipitation of the byproduct inorganic halide during the reaction. Preferably, a 5-50 wt. % solution of inorganic hydroxide in water is used. More preferably, a 10-25 wt. % solution of inorganic hydroxide in water is used. The amount of inorganic hydroxide used in step b) must be sufficient to give a product epoxy resin with low hydrolyzable halide content. This typically requires the use of some excess hydroxide, and the aqueous inorganic halide byproduct will also contain some unreacted inorganic hydroxide. Preferably, the ratio of the mole equivalents of inorganic hydroxide used in step b) to the mole equivalents of phenolic OH used in step a) is adjusted to give a product epoxy resin with a low hydrolysable chloride content and an aqueous inorganic halide byproduct stream with a low inorganic hydroxide content. Preferably, the ratio of the total amount of mole equivalents of hydroxide used in steps a) and b) to the mole equivalents of phenolic OH used in step a) is between 0.9:1 and 1.8:1. More preferably, the ratio of total mole equivalents of inorganic hydroxide used in steps a) and b) to mole equivalents of phenolic OH used in step b) is between 0.95:1 and 1.4:1. Most preferably, the ratio of total mole equivalents of inorganic hydroxide used in steps a) and b) to mole equivalents of phenolic OH used in step a) is between 0.98:1 and 1.25:1.

As in step a), a reaction cosolvent can be used. This cosolvent is described above in the description of step a). Alcohols with secondary or tertiary alcohol functionalities are preferred to limit reactivity with the epoxy resin product of step b). The reaction cosolvent preferably has either a high enough volatility to facilitate separation from the epoxy resin during solvent evaporation or a high enough partitioning coefficient to facilitate extraction from the mixture containing the epoxy resin reaction product and optional dilution solvent during wash. If the reaction cosolvent is to be removed from the epoxy resin by evaporation, the boiling point at atmospheric pressures is preferably less than 200° C., more preferably less than 150° C. The reaction cosolvent also preferably has high enough volatility to facilitate removal from brine or water by evaporation, distillation, or stripping. More preferably the reaction cosolvent forms an azeotrope with water that boils at a temperature below the boiling point of water. The amount by weight of the reaction cosolvent used is preferably from 0.2 to 10 times the weight of the epihalohydrin used, more preferably from 0.5 to 5 times the weight of the epihalohydrin used.

As in step a), a dilution solvent can be used. This dilution solvent is described above in the description of step a). The dilution solvent may be any solvent which increases solubility of the epoxy resin in the organic phase. The dilution solvent, when used, preferably contains no functionalities that react easily with the polyhydric phenol, the epihalohydrin, the alkali metal or alkali earth metal hydroxide, or water. The dilution solvent preferably has limited solubility in water to facilitate brine separation and water washing. The amount by weight of the dilution solvent used is preferably from 0.2 to 10 times the weight of the epihalohydrin used, more preferably from 0.5 to 5 times the weight of the epihalohydrin used.

A phase transfer catalyst may optionally be used in step b). Any known phase transfer catalyst that facilitates the two-phase reaction between the inorganic hydroxide and the bishalohydrin ether may be used. Examples of known phase transfer catalysts include quaternary ammonium halide catalysts such as benzyl trimethyl ammonium chloride, benzyl triethyl ammonium chloride, tetraethyl ammonium chloride, tetramethyl ammonium chloride, tetraethanol ammonium chloride and the like. Other useful phase transfer catalysts include quaternary ammonium hydroxides, quaternary phosphonium compounds, sulfonium compounds and the like. Suitable quaternary phosphonium compounds include ethyl triphenyl phosphonium iodide, ethyl triphenyl phosphonium bicarbonate, benzyl triphenyl phosphonium chloride, tetrabutyl phosphonium chloride and the like. Suitable sulfonium compounds include thiourea catalysts such as tetramethyl thiourea, N,N'-diphenyl thiourea and the like. The phase transfer catalyst may be the same as the etherification catalyst.

Reaction conditions of the dehydrohalogenation reaction may include a reaction temperature of from about 0° C. to about 100° C., preferably from about 10° C. and about 70° C. and more preferably from about 15° C. and 50° C.

Description of Reciprocating Plate Column Reactor

A reciprocating column for use in liquid-liquid extraction was first described by U.S. Pat. No. 2,011,186 (1935), herein incorporated by reference. Since then modifications to the column design have been made, mostly in the area of plate design.

FIG. 1 shows an overall schematic of a reciprocating plate column. As with all counter current extraction columns, the heavy phase is fed to the top of the column and the light phase is fed into the bottom of the column. A central shaft that supports the plates is connected to an agitating (reciprocating drive) mechanism at the top of the column.

Referring to FIG. 1, reciprocating plate column reactor 10 is shown. The height of the column can vary, as shown in cross section 22. Agitator shaft 16 agitates the plurality of perforated plates 18. Agitator shaft 16 is controlled by motor 20 using reciprocating agitator drive mechanism 21. The organic feed from step (a) enters the reactor via light continuous phase inlet 12. The organic feed moves slowly up the column. The aqueous feed enters the reactor via heavy dispersed phase inlet 14. The aqueous feed becomes dispersed in the column as small droplets via the reciprocating motion of agitator plates 18. While not wishing to be bound by theory, it is believed that small droplets produce the best reaction material. The organic feed is pushed farther up the column to clarification zone 24 by a continuous organic feed entering the column via light continuous feed inlet 12. The organic feed can then exit the column via light continuous phase outlet 26. Aqueous feed droplets and the enter chamber 28 where they coalesce to become the heavy phase below phase interface 30 (the top section being organic feed entering the column via light continuous feed inlet 12) and exit the column via heavy phase outlet 32.

The column can also work in reverse, i.e., the light phase being the dispersed phase instead of the heavy phase, then the interface is controlled at the top instead of the bottom. Depending on the composition of the organic and aqueous feeds, the organic may be either the light phase or the heavy phase.

Generally the stroke length (distance from top and bottom position of a plate) and the stroke frequency can be adjusted. Plate spacing can be adjusted as well to get the proper intensity of mixing.

The agitation frequency is generally in the range of from about 0.1 Hz to about 10 Hz. In an embodiment, the agitation frequency is in the range of from about 0.5 Hz to about 7 Hz, and is in the range of from about 1 Hz to about 5 Hz in yet another embodiment.

The stroke length is generally in the range of from about 0.2 cm to about 10 cm. In an embodiment, the stroke length is in the range of from about 0.5 cm to about 7 cm, and is in the range of from about 1 cm to about 5 cm in yet another embodiment.

The plate spacing is generally in the range of from about 0.3 cm to about 30 cm. In an embodiment, the plate spacing is in the range of from about 1 cm to about 15 cm, and is in the range of from about 2 cm to about 8 cm in yet another embodiment.

In this invention, any plate design may be used. Information about various plate designs can be found in Chapter 11 of Godfrey, J. C. and Slater, M. J. (eds), *Liquid-Liquid Extraction Equipment*, Wiley, 1994, entitled "Reciprocating-Plate Columns" by Baird, M. H. I., Rama Rao, N. V., Prochazka, J. and Sovova, H, herein incorporated by reference.

Figure 2:
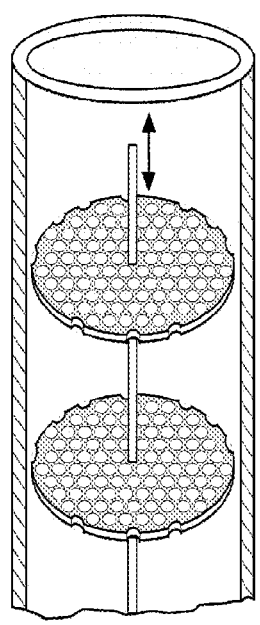
FIG. 2 depicts three types of reciprocating columns.
Figure 2:
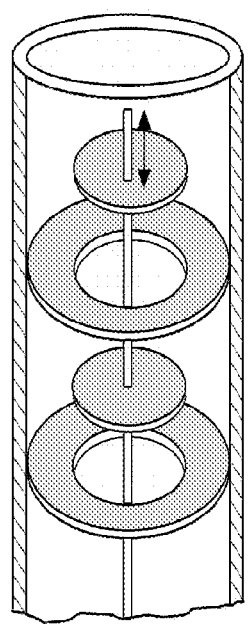
Figure 2:
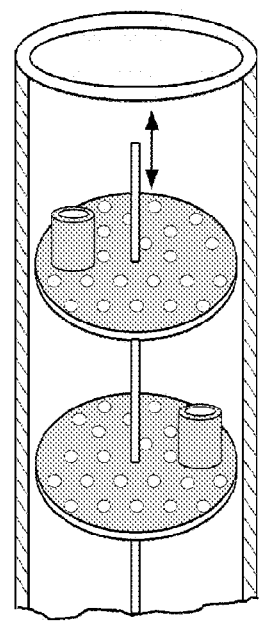

In one embodiment, known in the literature as the Karr column, the plates are perforated with 10-16 mm diameter holes with an open area of 50-60% of the cross-sectional area of the plate. In another embodiment, known in the literature as the Procházka column, the open area of the perforations is 4-30% of the cross sectional area of the plate and downcomers with an open area of 10-25% of the plate are used. The orientation of the downcomers may be either below the plate or above the plate, depending on whether the light phase or the heavy phase is the continuous phase. In another embodiment, known in the literature as the Tojo/Miyanami reciprocating plate column, solid disc plates with a diameter smaller than the column are attached to the agitator shaft and doughnut-shaped baffles are attached to the wall between each disc plate. These columns are depicted in FIG. 2. Alternatively, a pulsed column containing perforated plates may be used in place of the reciprocating-plate column for the dehydrohalogenation reaction.

Optional Steps

The crude reaction product of step b) comprising the dehydrohalogenated epoxy resin may be subjected to additional processing to yield the purified epoxy resin, including post-treatment reactions, extraction and/or other purification steps. The crude product may be washed with water one or more times to remove ionic and/or water soluble components.

The washed solution containing the crude reaction product may be distilled to remove volatile components such as excess epihalohydrin and/or reaction solvents to yield the purified epoxy resin.

End Uses

Epoxy resins are used in the manufacture of coatings, castings, composites, tooling, flooring and adhesives. For more information on the uses of epoxy resins, see Pham, H. Q., Marks, M. J., "Epoxy Resins", in Kirk-Othmer Encyclopedia of Chemical Technology, vol. 10, John Wiley and Sons, 2004, incorporated by reference herein.

EXAMPLES

Various terms and designations used in the following examples are explained herein below:

All parts and percentages are based upon weight, unless otherwise stated. ppm refers to parts per million. All temperatures are in ° C. Unless otherwise stated herein, "room temperature" and "ambient temperature" are nominally 25° C.

The following standard analytical equipments and methods are used in the Examples:

Phenolic hydroxyl content is measured by quantitative ultraviolet absorption analysis based on the well known bathochromic shift of the long wavelength maximum of phenols under alkaline conditions (see, for example, Wexler, A. S., Analytical Chemistry, 35 (12), 1936-1943, 1963).

Viscosity is measured using calibrated Cannon-Fenske tubes in a constant-temperature bath.

Epoxy equivalent weight, hydrolyzable chloride content and ionic chloride content are measured by well-known titration techniques for epoxy resins.

The content of volatile organic substances in the aqueous and organic mixtures is measured by gas chromatography (GC) using a flame ionization detector (FID).

The water content of an organic solution is measured by Karl-Fischer titration.

The epoxy resin species in an organic solution may be analyzed by high-performance liquid chromatography (HPLC) with a diode-array ultraviolet light detector (DAD); hydrolyzable chloride content in the resin may be estimated from the HPLC results.

Total organic carbon (TOC) is analyzed using a TOC analyzer, such as those made by Shimadzu.

Example 1

Preparation of Coupled Chlorohydrin Intermediate Mixture

A 34.2 lb quantity of bisphenol A (95% p,p'-bisphenol A purity), 97.0 lb epichlorohydrin, 43.6 lb isopropanol and 13.2 lb deionized water were combined in a jacketed stainless steel reactor equipped with an agitator, and mixed until the bisphenol A was dissolved. The contents of the reactor were brought to 40° C. After the caustic addition was completed, the reaction mixture was maintained at 40° C. with agitation to allow the caustic to fully react. The agitator was then stopped, and the two-phase mixture was allowed to stand for 30 minutes to allow the two liquid phases to separate. A 49.7 lb quantity of aqueous brine and 171.0 lb of organic phase containing the coupled chlorohydrins intermediate mixture were drained from the reactor. The organic phase was analyzed by gas chromatography and Karl-Fischer titration and was found to contain 24.8% isopropanol, 41.5% epichlorohydrin, 0.5% 1,3-dichloro-2-propanol, 0.1% glycidol and 5.4% water, with the balance being the coupled chlorohydrins intermediate. Analysis by UV spectroscopy found a phenolic OH content of 687 ppm.

Example 2

Epoxidation of Coupled Chlorohydrin Intermediate Mixture

A laboratory scale reciprocating-plate column was used to epoxidize the coupled chlorohydrins intermediate. The reactor column consisted of a vertical glass column with a height of 10 feet and an internal diameter of 1 inch. The column was equipped with ports at the top and bottom of the column for the introduction of the feed, an agitator, a jacket containing a recirculating heating/cooling fluid for temperature control, an unagitated phase separation receiver at the bottom of the column, an unagitated clarification region at the top of the column, and thermocouples for monitoring the temperature. The agitator consisted of a segmented shaft in the center of the column to which were attached perforated Teflon™ plates spaced at 1 inch intervals. The plates contained four holes with a diameter of 9/16 in, and 4 partial holes of the same diameter on the edge of the plate. The agitator was attached to a motor-driven mechanism which caused the agitator to reciprocate up and down. The speed and the stroke length of the agitator were adjustable. Laboratory-scale reciprocating-plate columns of this nature can be obtained from Koch Modular Process Systems, Inc., under the trademarked name Karr™ columns.

The organic mixture from Example 1 containing the coupled chlorohydrin intermediate was fed into the bottom feed port of the column at a flow rate of 15 g/min and a 20% aqueous caustic mixture was fed into the top feed port at a flow rate of 4.5 g/min. The heating/cooling fluid temperature was adjusted to give a column operating temperature of 40° C. The agitator drive was set for 200 strokes per minute with a stroke length of 0.75 inches. The dispersed aqueous phase fell through the column and accumulated in the bottom phase separation receiver. The collected aqueous phase was slowly removed from the bottom receiver through a manual needle valve, and the valve was adjusted to keep a stable interface height in the receiver. The organic phase overflowed from the unagitated clarification region at the top of the column to an organic product receiver. The column was operated in a stable fashion for 7.5 hours to allow the column to reach steady state. Samples of the aqueous and organic feeds and products were collected. The organic product was analyzed by high-performance liquid chromatography (HPLC) and gas chromatography (GC). The aqueous product was analyzed by GC, TOC analysis and caustic titration. The hydrolyzable chloride content of the epoxy resin in the organic phase was estimated from the HPLC analysis to contain less than 100 ppm of hydrolyzable chloride on a resin weight basis. The aqueous phase was found to contain 2.2% isopropanol, 0.5% glycidol, and 24000 ppm TOC. The epichlorohydrin yield loss was estimated from the TOC content after correction for the isopropanol content. The epichlorohydrin yield loss was estimated to be 6.6% of the epichlorohydrin used to make the epoxy resin in the organic phase. This example demonstrates that complete epoxidation of the epoxy resin can be achieved with low epichlorohydrin yield losses using a reciprocating-plate column.

Example 3

Epoxidation of Coupled Chlorohydrin Intermediate Mixture

Example 2 was repeated, except that 1 inch plate spacing was used in the top 5 feet and 2 inch plate spacing was used in the bottom 5 feet of the agitated section of the reciprocating plate column. The coupled chlorohydrin intermediate organic mixture was fed into the bottom feed port of the column at a flow rate of 7.4 g/min and a 20% aqueous caustic mixture was fed into the top feed port at a flow rate of 1.5 g/min. The heating/cooling fluid temperature was adjusted to give a column operating temperature of 30° C. The agitator drive was set for 240 strokes per minute with a stroke length of 0.75 inches. The column was operated in a stable fashion for 22 hours to allow the column to reach steady state. Samples of the aqueous and organic feeds and products were collected. The organic product was analyzed by high-performance liquid chromatography (HPLC) and gas chromatography (GC). The aqueous product was analyzed by GC, TOC analysis and caustic titration. The hydrolyzable chloride content of the epoxy resin in the organic phase was estimated from the HPLC analysis to contain less than 100 ppm of hydrolyzable chloride on a resin weight basis. The aqueous phase was found to contain 3% isopropanol, 0.6% glycidol, and 24000 ppm TOC. The epichlorohydrin yield loss was estimated from the TOC content after correction for the isopropanol content. The epichlorohydrin yield loss was estimated to be 2.5% of the epichlorohydrin used to make the epoxy resin in the organic phase.

What is claimed is:
1. A process comprising:
 a) contacting a polyhydric phenol and an epihalohydrin in the presence of a catalyst under reaction conditions to form an organic feed comprising a bishalohydrin ether and at least 10 weight percent of a solvent, wherein the molar ratio of said epihalohydrin to said polyhydric phenol is in the range of from 1:1 to 50:1;
 b) contacting said organic feed comprising a bishalohydrin ether and at least 10 weight percent of a solvent and an aqueous feed comprising an inorganic hydroxide in a reciprocating-plate column reactor under reaction conditions to form a dispersed aqueous phase and an organic product, wherein said reaction conditions comprise a reaction temperature of from 15° C. to 50° C.; and
 c) collecting said organic product comprising an epoxy resin, wherein the epihalohydrin yield loss ranges from 2.5% to 6.6% used to make the epoxy resin.

2. A process in accordance with claim 1 wherein said phenol is selected from the group consisting of bisphenol-A, bisphenol-F, phenol-formaldehyde novolacs, cresol-formaldehyde novolacs, bisphenol-A-formaldehyde novolacs, trisphenols, biphenols, diphenols, hydroquinone and combinations thereof and said epihalohydrin is selected from the group consisting of epichlorohydrin, epibromohydrin, methylepichlorohydrin and combinations thereof.

3. A process in accordance with claim 1 wherein said catalyst of step a) is selected from the group consisting of sodium hydroxide, potassium hydroxide, calcium hydroxide, and combinations thereof.

4. A process in accordance with claim 1 wherein excess epihalohydrin is used in step (a).

5. A process in accordance with claim 1 wherein said inorganic hydroxide of step b) is selected from the group consisting of sodium hydroxide, potassium hydroxide, calcium hydroxide, and combinations thereof.

6. A process in accordance with claim 1 wherein step a) is conducted in the presence of a cosolvent selected from the group consisting of isopropanol, 1-methoxy-2-propanol, and combinations thereof.

7. A process in accordance with claim 1 wherein step a) is conducted in the presence of a dilution solvent selected from the group consisting of toluene, xylenes, methyl ethyl ketone, methyl isobutyl ketone, and combinations thereof.

8. A process in accordance with claim 1 wherein step b) is conducted in the presence of a dilution solvent selected from the group consisting of toluene, xylenes, methyl ethyl ketone, methyl isobutyl ketone, and combinations thereof.

9. A process in accordance with claim 1 wherein said solvent further comprises a group comprising epihalohydrin, a cosolvent, a dilution solvent, and combinations thereof.

10. A process in accordance with claim 1 wherein step b) is conducted in the presence of a cosolvent selected from the group consisting of isopropanol, 1-methoxy-2-propanol, and combinations thereof.

11. A process in accordance with claim 1 wherein step b) is conducted in the presence of a phase transfer agent.

12. A process in accordance with claim 11 wherein said phase transfer agent is a quaternary amine.

13. A process in accordance with claim 1 wherein said collecting in step c) comprises:
 i. washing said organic product with water; and
 ii. devolatilizing said organic product to form said epoxy resin.

14. A process in accordance with claim 1 wherein said reaction conditions in step a) comprise a first reaction temperature in the range of from 10° C. to 100° C. and said reaction conditions in step b) comprise a second reaction temperature in the range of from 0° C. to 100° C.

15. A process in accordance with claim 1 wherein said reciprocating column reactor has a stroke length in the range of from 0.2 cm to 10 cm, an agitation frequency in the range of from about 0.1 Hz to about 10 Hz, and a plate spacing in the range of from about 0.3 cm to about 30 cm.

16. A process in accordance with claim 9 wherein said solvent is removed and replaced with a different solvent before said contacting of step b).

17. A process in accordance with claim 1 wherein 80% or more of the polyhydric phenolic OH groups are etherified.

* * * * *

UNITED STATES PATENT AND TRADEMARK OFFICE
CERTIFICATE OF CORRECTION

| | | |
|---|---|---|
| PATENT NO. | : 9,527,950 B2 | Page 1 of 1 |
| APPLICATION NO. | : 13/600461 | |
| DATED | : December 27, 2016 | |
| INVENTOR(S) | : Thomas C. Young, William G. Worley and Robert M. Drake | |

It is certified that error appears in the above-identified patent and that said Letters Patent is hereby corrected as shown below:

On the Title Page

Item (60), Replace Sep. 23, 2012 with --Feb. 23, 2012--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*